United States Patent [19]

McGrath et al.

[11] Patent Number: 5,615,930

[45] Date of Patent: Apr. 1, 1997

[54] ELECTRONIC TRAILER BRAKE CONTROLLER

[75] Inventors: Michael C. McGrath, Farmington Hills; Michael A. Hedding, Canton, both of Mich.

[73] Assignee: Hayes Wheels International, Inc., Romulus, Mich.

[21] Appl. No.: 572,930

[22] Filed: Dec. 15, 1995

[51] Int. Cl.⁶ ........................................... B60T 8/16
[52] U.S. Cl. .................. 303/7; 303/20; 303/124
[58] Field of Search .................... 303/7, 20, 3, 15, 303/124, 138

[56] References Cited

U.S. PATENT DOCUMENTS

| | | |
|---|---|---|
| 3,497,266 | 2/1970 | Umpleby . |
| 3,503,652 | 3/1970 | Broek . |
| 3,574,414 | 4/1971 | Jacob ............................................ 303/7 |
| 3,738,710 | 6/1973 | Pokrinchak et al. . |
| 3,778,118 | 12/1973 | Podlewski et al. ...................... 303/124 |
| 3,780,832 | 12/1973 | Marshall . |
| 3,909,075 | 9/1975 | Pittet, Jr. et al. . |
| 3,967,863 | 7/1976 | Tomecek et al. . |
| 3,981,542 | 9/1976 | Abrams et al. . |
| 3,981,544 | 9/1976 | Tomecek et al. . |
| 4,079,804 | 3/1978 | Paillard ................................. 188/138 |
| 4,084,859 | 4/1978 | Bull et al. ..................................... 303/7 |
| 4,196,936 | 4/1980 | Snyder . |
| 4,295,687 | 10/1981 | Becker et al. . |
| 4,419,654 | 12/1983 | Funk ........................................ 303/124 |
| 4,721,344 | 1/1988 | Frait et al. ..................................... 303/7 |
| 4,856,850 | 8/1989 | Aichele et al. . |
| 5,050,937 | 9/1991 | Eccleston ..................................... 303/7 |
| 5,149,176 | 9/1992 | Eccleston . |
| 5,333,948 | 8/1994 | Austin et al. . |
| 5,352,028 | 10/1994 | Eccleston . |

Primary Examiner—Matthew C. Graham
Attorney, Agent, or Firm—MacMillan, Sobanski & Todd

[57] ABSTRACT

An electronic brake controller for actuating electric wheel brakes of a towed vehicle in response to braking of an associated towing vehicle. The controller includes a microprocessor responsive to the braking of the towing vehicle for generating an output signal for actuating the towed vehicle brakes in accordance with a brake response curve. The brake response curve can include a non-linear portion.

44 Claims, 5 Drawing Sheets

ELECTRONIC TRAILER BRAKE CONTROLLER

BACKGROUND OF THE INVENTION

The present invention relates in general to an electronic controller for energizing electrically operated brakes in a towed vehicle and, in particular, to an electronic brake controller which energizes the towed vehicle brakes in accordance with a brake response curve.

Towed vehicles, such as recreational and utility trailers adapted to be towed by automobiles and small trucks, are commonly provided with electric brakes. The electric brakes generally include a pair of brake shoes which, when actuated, frictionally engage a brake drum. An electromagnet is mounted on one end of a lever to actuate the brake shoes. When an electric current is applied to the electromagnet, the electromagnet is drawn against the rotating brake drum which pivots the lever to actuate the brakes. Typically, the braking force produced by the brake shoes is proportional to the electric current applied to the electromagnet. This electric current can be relatively large. For example, the electric brakes on a two wheeled trailer can draw six amperes of current when actuated and the electric brakes on a four wheeled trailer can draw 12 amperes of current.

Automotive industry standards require that electrically-actuated vehicle brakes be driven against the ground potential of the vehicle power supply. Accordingly, one end of each of the towed vehicle brake electromagnets is electrically connected to the towed vehicle ground and the towed vehicle ground is electrically connected to the towing vehicle ground. The other end of each of the brake electromagnets is electrically connected through an electric brake controller to the towing vehicle power supply.

Various electric brake controllers for towed vehicle electric brakes are known in the art. For example, a variable resistor, such as a rheostat, can be connected between the towing vehicle power supply and the brake electromagnets. The towing vehicle operator manually adjusts the variable resistor setting to vary the amount of current supplied to the brake electromagnets and thereby control the amount of braking force developed by the towed vehicle brakes.

Also known in the art are more sophisticated electric brake controllers which include electronics to automatically supply current to the brake electromagnets when the towing vehicle brakes are applied. Such electronic brake controllers typically include a sensing unit which generates a brake control signal corresponding to the desired braking effort. For example, the sensing unit can include a pendulum which is displaced from a rest position when the towing vehicle decelerates and an electronic circuit which generates a brake control signal which is proportional to the pendulum displacement. One such unit is disclosed in U.S. Pat. No. 4,721,344. Alternately, the hydraulic pressure in the towing vehicle's braking system or the pressure applied by the driver's foot to the towing vehicle's brake pedal can be sensed to generate the brake control signal.

Known electronic brake controllers also usually include an analog pulse width modulator which receives the brake control signal from the sensing unit. The pulse width modulator is responsive to the brake control signal for generating an output signal comprising a fixed frequency pulse train. The pulse width modulator varies the duty cycle of the pulse train in proportion to the magnitude of the brake control signal. Thus, the duty cycle of the pulse train corresponds to the amount of braking effort desired.

Electronic brake controllers further include an output stage which is electrically connected to the output of the pulse width modulator. The output stage typically has one or more power transistors which are connected between the towing vehicle power supply and the towed vehicle brake electromagnets. The power transistors function as an electronic switch for supplying electric current to the towed vehicle brakes.

The output stage is responsive to the pulse width modulator output signal to switch the power transistors between conducting, or "on", and non-conducting, or "off", states. As the output transistors are switched between their on and off states in response to the modulator output signal, the brake current is divided into a series of pulses. The power supplied to the towed vehicle brakes and the resulting level of brake application are directly proportional to the duty cycle of the modulator generated output signal.

SUMMARY OF THE INVENTION

The present invention relates to an improved electronic brake controller for actuating electric wheel brakes of a towed vehicle in accordance with a brake response curve.

The improved electronic trailer brake controller includes a detection device for detecting an initiation of a towing vehicle braking cycle. The detection device is responsive to a braking cycle initiation to generate an input signal. The controller also includes a control device connected to the detecting device. The control device is operable to generate a brake response curve and an output signal for actuating the towed vehicle brakes. The brake response curve defines a time relationship between the input signal and the output signal. The control device is responsive to the input signal and the brake response curve to generate the output signal with the output signal varying as a function of time in accordance with the brake response curve.

The invention also contemplates that the control device can include a microprocessor.

It is contemplated that the brake controller microprocessor includes a memory having a plurality of brake response curves stored therein. The controller has a selector which is operative by the towing vehicle operator and causes the microprocessor to select one of the stored brake response curves.

Alternately, the brake controller microprocessor is adapted to be connected by a data link to a device for collecting towing vehicle operating data. The data collection device can include a towing vehicle control system which has a microprocessor. Additionally, the data collection device can include a sensor mounted upon the towing vehicle. The brake controller microprocessor receives towing vehicle operating data over the data link and is responsive thereto to select one of the brake response curves.

The invention further contemplates that at least one of the brake response curves can include a non-linear portion.

Another embodiment of the electronic brake controller microprocessor has a plurality of brake response curve algorithms stored therein. The controller also has a plurality of selectors which are operative by the towing vehicle operator to input towing vehicle operating data to the microprocessor. The microprocessor combines the towing vehicle operating data with the algorithms to generate a brake response curve. Alternately, the brake controller microprocessor can be connected by a data link to a device for collecting operating data for the towing vehicle. The microprocessor receives towing vehicle operating data over the data link and is responsive thereto to combine the operating data with the algorithms to generate the brake response curve.

The invention also contemplates that the detection device can be a sensor. The sensor can be adapted to be connected to the towing vehicle brake light circuit. The sensor generates an input signal which includes a brake trigger signal while the towing vehicle brakes are actuated and discontinues generation of the brake trigger signal upon release of the towing vehicle brakes.

Alternately, the sensor can be an inertial sensor which is operable to generate an input signal which includes a series of brake trigger signals upon deceleration of the towing vehicle. The microprocessor receives the brake trigger signals and averages the brake trigger signals over a predetermined period of time to generate an average brake trigger signal. The microprocessor initiates a braking cycle only when the average brake trigger signal exceeds a predetermined threshold value. The controller can further include a selector which is operable by the towing vehicle operator to adjust the predetermined averaging time period.

The invention further contemplates that the sensor generates an input signal which includes a brake control signal. The microprocessor is responsive to the brake control signal to generate an output signal which varies in accordance with the brake control signal and the brake response curve. Similarly, the microprocessor can average the brake control signal over a predetermined time period to determine an average brake control signal. The microprocessor then generates an output signal which is a function of the average brake control signal and the brake response curve.

Other objects and advantages of the invention will become apparent from the following detailed description of the invention and the accompanying drawings.

DETAILED DESCRIPTION OF THE PREFERRED EMBODIMENT

Figure 1:
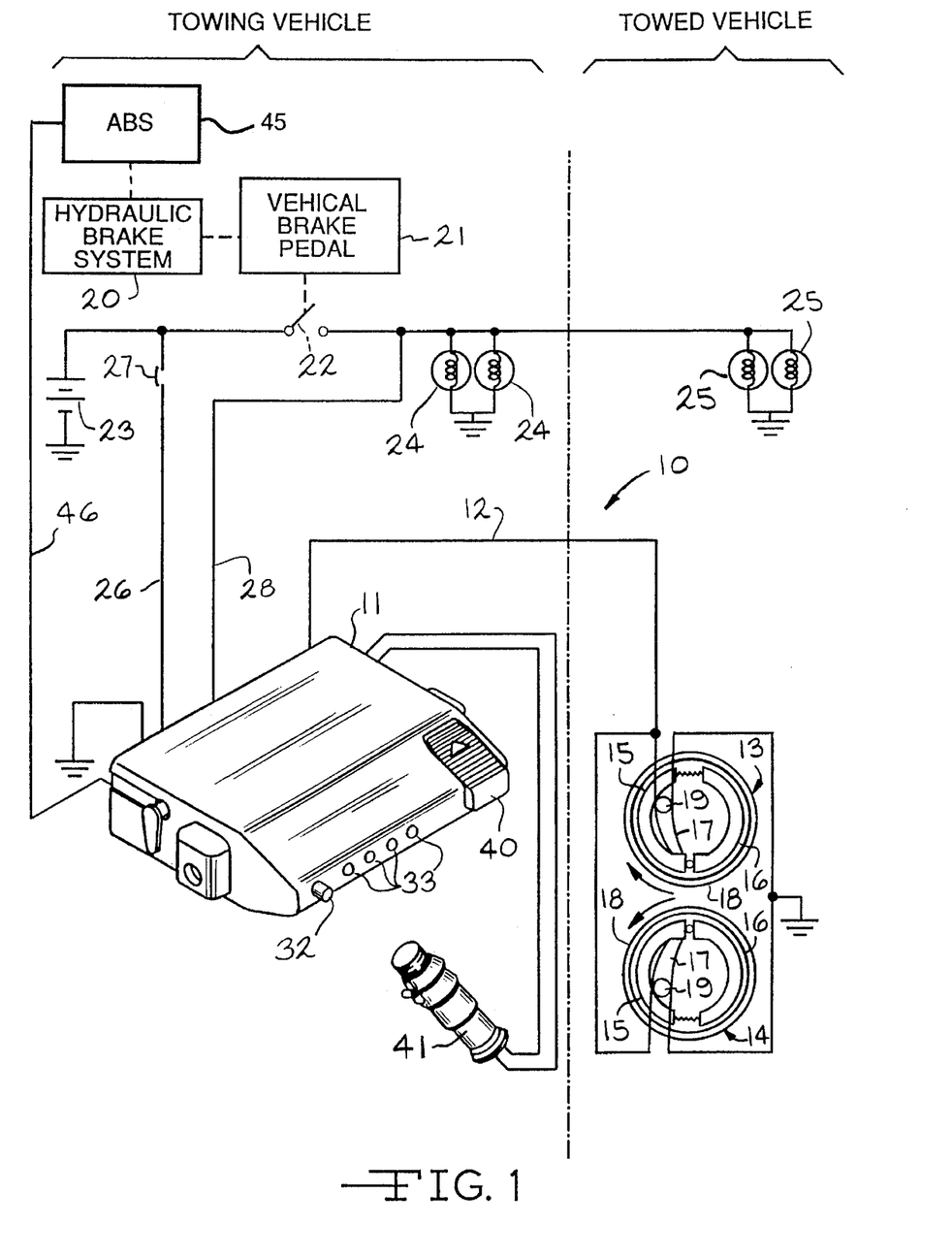
FIG. 1 is a schematic diagram illustrating an electric brake system which includes an electronic brake controller.

Referring now to the drawings, there is shown in FIG. 1 a schematic diagram illustrating an electric brake system for a towed vehicle (not shown), shown generally at 10, which utilizes an electronic brake controller 11 embodying the principles of the present invention. The brake controller 11 is typically located in a towing vehicle (not shown), usually being mounted beneath the towing vehicle dashboard. When actuated, the controller 11 functions to supply an electric current through line 12 to energize electric brakes 13 and 14 which brake the wheels of the towed vehicle (not shown).

The electric brakes 13 and 14 each include a pair of brake shoes 15 and 16 which, when actuated by a lever 17, are expanded into contact with a brake drum 18 for braking the wheels of the towed vehicle. A separate electromagnet 19 is mounted on an end of each of the brake actuating levers 17. Each electromagnet 19 is positioned to abut the generally flat side of the brake drum 18. As an electric current is passed through each of the electromagnets 19, the electromagnets 19 are drawn into contact with the brake drums 18 and the resulting drag pivots the levers 17 to engage the brake shoes 15 and 16 in a conventional manner. It will be appreciated that, while FIG. 1 shows two sets of brakes 13 and 14, the invention also can be applied to towed vehicles having more than two sets of brakes.

The towing vehicle typically includes a conventional hydraulic brake system 20 which is actuated when a brake pedal 21 is depressed by a vehicle driver. The brake pedal 21 is coupled to a brake light switch 22. When the brake pedal 21 is depressed, the switch 22 is closed and power from a vehicle power supply 23, shown as a storage battery in FIG. 1, is supplied to one or more towing vehicle brake lights 24 and one or more towed vehicle brake lights 25. The vehicle power supply 23 is also connected by a first line 26 through a circuit breaker 27 to the controller 11. Power is continuously supplied to the controller 11 through the first line 27. It will be appreciated that, while a circuit breaker 27 is shown in FIG. 1, a fuse or other overcurrent protection device can be used. A second line 28 connects the brake light side of the brake light switch 22 to the controller 11. The second line 28 supplies power to the controller 11 when the brake light switch 22 is closed upon actuation of the towed vehicle brakes.

The brake controller 11, which is described in detail in co-pending patent application Ser. No. 08/313,703, filed on Sep. 27, 1994, senses the braking force applied to the towing vehicle and generates a brake control signal. In the preferred embodiment, a pendulum device senses the braking force and generates the brake control signal, however, it will be appreciated that other devices can be used to generate the brake control signal. For example, the hydraulic brake fluid pressure can be sensed and used to generate the brake control signal. A device for sensing the brake fluid pressure (not shown) is described in U.S. Pat. No. 4,295,687, which is hereby incorporated by reference. Similarly, the force applied to the brake pedal 21 can be sensed by a pressure sensitive pad (not shown) attached thereto. The pad, which generates a brake control signal proportional to the applied force, is described in U.S. Pat. No. 5,115,162, which is hereby incorporated by reference. The brake control signal also can be generated by microprocessors used to control anti-lock and traction control systems. Alternately, wheel speed sensor signals for the towing vehicle wheels can be used to generate the brake control signal. Additionally, electromagnetic sensors using magnetically actuated potentiometers can be used to generate the brake control signal. Various commercially available accelerometers, including ones which incorporate a mercury switch, can generate the brake control signal.

The controller 11 further includes a microprocessor (not shown) which, in the preferred embodiment, is a preprogrammed eight bit device. The microprocessor is responsive to the brake control signal to generate an output signal. The output signal is a pulse train which is transmitted through line 12 to actuate the electric brakes 13 and 14. The output signal is related to the brake control signal by an adjustable controller gain. In the preferred embodiment, the output signal has a constant frequency and a variable duty cycle which is proportional to the brake control signal.

A gain control push-button 32 is mounted on the front of the controller 11 and is operative to select the controller gain setting. The controller 11 also includes a plurality of Light Emitting Diodes (LED's) 33 which provide visual feedback to the towing vehicle operator. When the gain control push-button is depressed, selected LED'S 33 are illuminated to indicate the present value of the controller gain. Successive operation of the push-button 32 sequences the microprocessor through the available gain values while the corresponding value appears on the display 35. When the desired gain value is displayed, the operator stops operating the push-button 32 and the controller adapts the displayed gain setting.

A manual switch 40 is provided on the electronic controller 11 to allow the vehicle driver to actuate the towed vehicle brakes 13 and 14 without applying the towing vehicle brakes. Pressing the manual switch 40 causes the microprocessor to generate the output signal. The controller 11 also is provided with a hand held manual remote switch 41. The manual remote switch 41 includes a push-button which can be used to actuate the controller 11. When either the manual switch 40 or the manual remote switch 41 are pressed, the towing vehicle and towed vehicle brake lights 24 and 25 are illuminated.

In the preferred embodiment, the controller 11 is electrically coupled to an anti-lock brake system 45 (ABS), which is included in the towing vehicle, by a data link 46. While a single line is shown for the data link 46 in FIG. 1, it will be appreciated that the data link 46 may be a multi-conductor cable or a portion of a data highway. While the controller 11 is illustrated and described as being coupled to an ABS, it will be appreciated that the controller 11 also can be utilized in a vehicle which is not ABS equipped The ABS 45 is of a conventional design and is responsive to data concerning the operation of the towing vehicle to control the hydraulic brake system 20 during impending wheel brake lock-up conditions. The ABS 45 sends data over the data link 46 to the controller 11. The controller 11 is responsive to the data to control the towed vehicle brakes 13 and 14 as a function thereof. For example, actuation of the ABS 45 due to an impending wheel lock-up condition of the towing vehicle brakes could cause the brake controller 11 to decrease the braking intensity of the towed vehicle. Other examples of data which can be transmitted from the ABS 45 to the controller 11 include vehicle speed, vehicle deceleration, brake failure, brake application, and changes in road surface conditions.

The communication over the data link 46 is bi-directional, with the controller 11 also sending data to the ABS 45. For example, the controller 11 could transmit the controller gain, which is indicative of the towed vehicle load, to the ABS 45. The ABS 45 would accordingly adjust the magnitude of the towing vehicle braking. However, it will be appreciated that the communication over the data link 45 also can be uni-directional.

While the controller 11 has been illustrated as being connected to an ABS 45 in FIG. 1, it will be appreciated that the controller 11 also can be connected to and communicating with other vehicle control systems. Examples of such systems include traction control systems, engine control computers and vehicle diagnostic computers.

Figure 2:
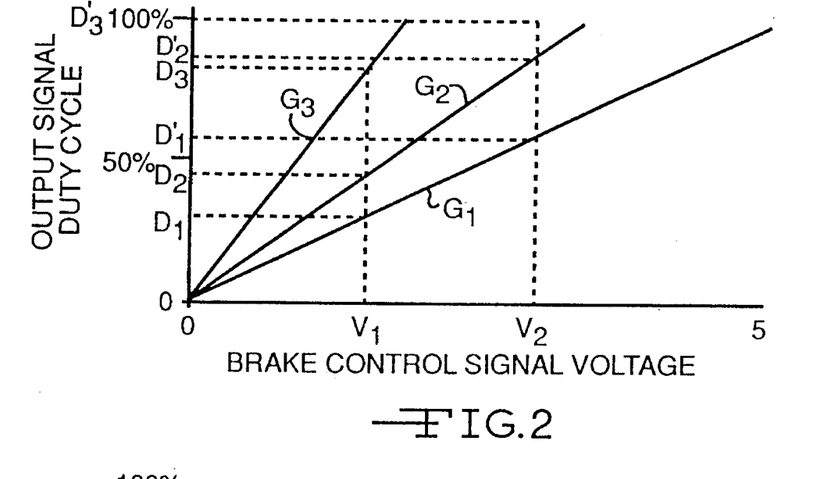
FIG. 2 is a graph illustrating response curves for the brake controller shown in FIG. 1.

The relationship between the duty cycle of the microprocessor output signal, the magnitude of the brake control signal and the microprocessor gain is illustrated by the graph shown in FIG. 2. The horizontal axis in FIG. 2 represents the brake control signal magnitude while the vertical axis represents the output signal duty cycle. Accordingly, the scale on the horizontal axis varies from zero, representing no towing vehicle brake application to five volts, representing the maximum magnitude of the brake control signal. The scale on the horizontal axis varies from a zero duty cycle, representing no output signal from the microprocessor and no towed vehicle brake application, to a 100 percent duty cycle, representing a continuous output signal and maximum towed vehicle brake application.

The graph in FIG. 2 includes three straight lines which are labeled $G_1$, $G_2$ and $G_3$ and represent brake controller response curves. These straight lines illustrate typical microprocessor responses for three brake controller gains where the gain for $G_3$ is greater than the gain for $G_2$ and the gain for $G_2$ is greater than the gain for $G_1$. While three gains are illustrated, it will be appreciated that more or less gain settings can be programmed into the brake controller 11.

As shown in FIG. 2, the duty cycle of the microprocessor output signal corresponding to a specific brake control signal is a function of the brake controller gain. For example, the vehicle operator can depress the towing vehicle brake pedal 21 at a time $t_1$ to cause the brake control signal generator to generate a first brake signal voltage, $V_1$, which is shown on the horizontal axis in FIG. 2. When the brake controller gain setting is $G_1$, the microprocessor output signal duty cycle corresponding to the first brake control signal $V_1$ is $D_1$, or approximately 30 percent. Similarly, with a gain setting of $G_2$, the duty cycle corresponding to $V_1$ is $D_2$, which, in the example illustrated, is about 50 percent; and, with a gain setting of $G_3$, the duty cycle corresponding to $V_1$ is $D_3$, or approximately 80 percent.

If, at a later time $t_2$, the vehicle operator further depresses the brake pedal 21, the brake control signal generator generates a second brake control signal, $V_2$, which is greater than the first brake control signal, $V_1$. As shown in FIG. 2, the corresponding output signal duty cycles, $D_1'$, $D_2'$, and $D_3'$ for each of the response curves $G_1$, $G_2$ and $G_3$ are greater than the duty cycles $D_1$, $D_2$, and $D_3$ corresponding to the first brake control signal $V_1$.

Figure 3:
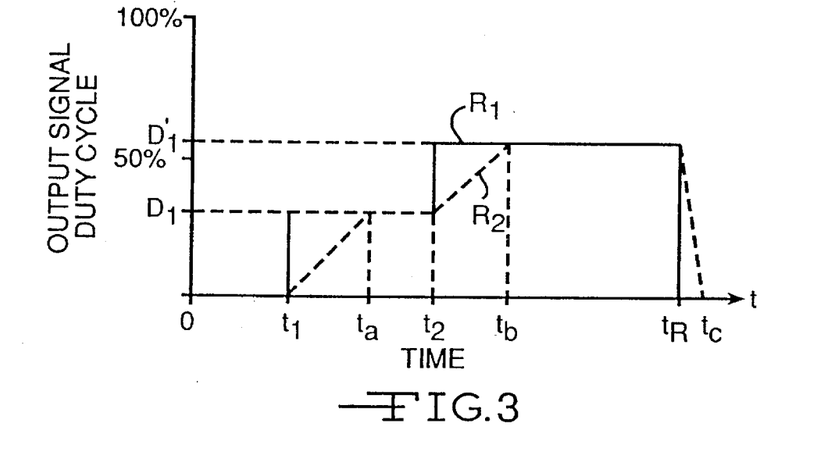
FIG. 3 is a graph illustrating the time response of a linear brake controller in accordance with the invention.

The duty cycle of the microprocessor output signal also is a function of time. The variation of the duty cycle of the microprocessor output signal with time is shown in FIG. 3 where a typical braking cycle is illustrated. In FIG. 3, the horizontal axis represents time while the vertical axis again represents the output signal duty cycle. For simplicity, the microprocessor response is shown in FIG. 3 for only one gain setting, $G_1$; however, similar responses would occur for other gain settings.

The solid line labeled $R_1$ in FIG. 3 represents the microprocessor response to the brake control signal which was described above. At $t_1$, the microprocessor is responsive to the first brake control signal $V_1$ to generate an output signal having the duty cycle $D_1$. At $t_2$, when the vehicle operator further depresses the brake pedal 21, the brake control signal increases to $V_2$ and the microprocessor begins generating an output signal with the duty cycle $D_1'$. At $t_R$, the operator releases the brake pedal 21 causing the microprocessor to stop generating an output signal.

As shown by $R_1$ in FIG. 3, the microprocessor output signal instantaneously switches at $t_1$ from zero to a signal having the duty cycle $D_1$. Similarly, at $t_2$, the duty cycle of the output signal instantaneously increases from $D_1$ to $D_1'$. As described in the co-pending application described above, the microprocessor output signal is applied to a brake driver which controls a brake switching circuit. The brake switching circuit energizes the electric brake coils 19 to actuate the towed vehicle brakes. While the inductance of the brake coils 19 will prevent an instantaneous actuation of the towed vehicle brakes, the towed vehicle brakes are applied very rapidly, which can cause the brakes to grab. As a result, the towed vehicle can decelerate more rapidly than the towing vehicle, thereby straining the towing connection.

The present invention contemplates programming the microprocessor to change the output signal duty cycle in response to a change in the brake control signal as a function of time. The dashed line labeled $R_2$ in FIG. 3 illustrates a preprogrammed linear relationship between the output signal duty cycle and time. Thus, at $t_1$, the duty cycle begins to increase at a constant rate until $D_1$ is reached at $t_a$. The constant rate defines a ramp function. In response to the ramp function, the brake driver and brake switching circuit gradually increase the electric current supplied to energize the brake coils 19 to smoothly actuate the towed vehicle brakes.

Similarly, at $t_2$, the brake control signal changes from $V_1$ to $V_2$ and the microprocessor begins a ramp increase of the output signal duty cycle from $D_1$ to $D_1'$. The increased duty cycle $D_1'$ is reached at time $t_b$. In the preferred embodiment, the ramp from $t_2$ to $t_b$ has the same slope as the ramp from $t_1$ to $t_a$, however, the ramps may have different slopes.

The output signal duty cycle remains at $D_1'$ until the brake pedal 21 is released at time $t_R$, at which time the microprocessor decreases the duty cycle of the output signal to zero, which is reached at time $t_c$. As shown in FIG. 3 the slope, from $t_R$ to $t_c$ is greater than the slopes from $t_1$ to $t_a$ and from $t_2$ to $t_b$. Because the brakes are being released, inclusion of a ramp response at the end of the brake cycle is optional.

The present invention also contemplates that a plurality of slopes of the ramp are programmed into the microprocessor. A particular slope is selected by the towing vehicle operator to match the towed vehicle and/or towed vehicle load. Thus, a gentle slope is selected when the towed vehicle is empty and a steeper slope is selected to apply the brakes more quickly when the towed vehicle is loaded. Slopes could also be selected to match road conditions with gentler slopes used on slippery road surfaces.

In the preferred embodiment, the slope is selected by manual operation of the gain push-button 32. The gain push-button 32 is depressed for a predetermined time period to signal the microprocessor that the response slope is to be changed. The microprocessor illuminates selected LED's 33 to indicate receipt of the signal to change the slope. Then the specific slope is:selected by depressing the gain control button 32 a corresponding number of times. The microprocessor again illuminates the LED's to indicate the slope selected. Alternately, a separate slope selection push-button (not shown) or slope selector knob (not shown) could be added to the brake controller 11.

Figure 4:
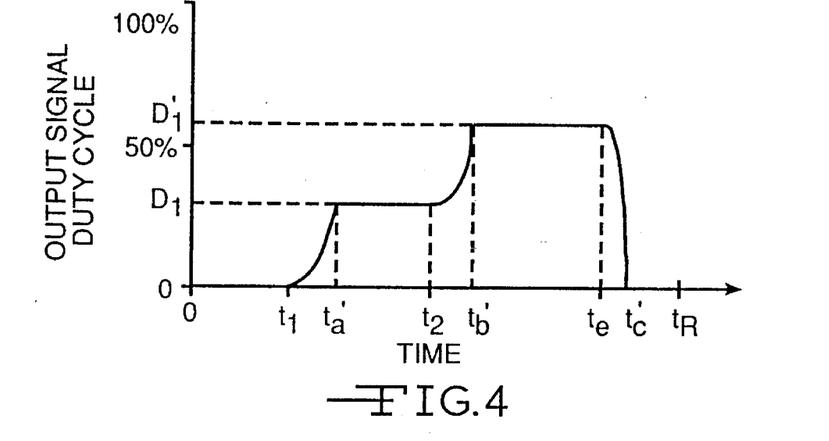
FIG. 4 is graph illustrating the time response of a non-linear brake controller in accordance with the invention.

The present invention further contemplates that the microprocessor can be programmed to generate an output signal having a duty cycle which is a non-linear function of time, as illustrated in FIG. 4. In FIG. 4, the duty cycle is increased with an increasing rate from $t_1$ to $t_a'$ and from $t_2$ to $t_b'$. Thus, the intensity of the towed vehicle brake application increases with an increasing rate with the passage of time. As described above, the duty cycle remains constant once the desired value is reached. As also described above, it is contemplated than a plurality of non-linear relationships would be stored in the microprocessor with a specific one of the non-linear relationships being selected by the towing vehicle operator to correspond to the specific towed vehicle and/or road conditions.

In the preferred embodiment illustrated in FIG. 4, the braking cycle is terminated at a cycle end time, $t_e$, which occurs before the brake pedal is released at $t_R$. The cycle end time $t_e$ is calculated by adding the maximum stopping time for the towing and towed vehicles to the time at which the last change in duty cycle occurs, which is $t_b'$ in FIG. 4. Typically, the maximum stopping time is less than two minutes. When the brake application time exceeds the cycle end time, $t_e$, the brake controller 11 releases the towed vehicle brakes. This precludes overheating the towed vehicle brakes while halted in stopped traffic. As shown in FIG. 4, the output signal duty cycle is reduced from $t_e$ to $t_c'$ in accordance with a non-linear function of time. Because the brakes are being released, inclusion of a non-linear response at the end of the brake cycle is optional.

Alternately, the microprocessor can be programmed to continue to generate an output signal once the final duty cycle $D_1'$ is reached until the brake pedal 21 is released at $T_R$. At $t_R$, the duty cycle of the output signal can be instantaneously reduced to zero or ramped to zero as illustrated at the end of the braking cycle in FIG. 3.

Additionally, the microprocessor can be programmed to reduce the duty cycle of the output signal by a predetermined amount at $t_e$ and continue at that level until $t_R$ (not shown). For example, at $t_e$, the duty cycle could be reduced to 20 percent of $D_1'$ and remain at that level until $t_R$. Thus, a light application of the towed vehicle brakes would continue until the end of the braking cycle. This could be desirable for holding the towing and towed vehicles stationary on an incline.

As described above, the brake controller 11 can be connected by a data link 46 to a microcomputer or control system carried on the towing vehicle. For example, as shown in FIG. 1, the brake controller 11 can be connected to the ABS of the towing vehicle. When a data link 46 is available, the invention contemplates that the microprocessor continuously monitors the speed of the towing vehicle. The microprocessor uses the towing vehicle speed to calculate the maximum stopping time $t_m$ required to stop the towing and towed vehicles. The microprocessor then calculates $t_e$ as:

$$t_e = t_b' + t_m.$$

The maximum stopping time $t_m$ and cycle end time $t_e$ would be continuously updated by the microprocessor.

Additionally, the ABS sensor data could be used to determine when the towing vehicle passes from a high mu to low mu road surface, as occurs when moving from a dry to a wet or icy road. This data would be used by the microprocessor to select an appropriate response curve for the output signal duty cycle. Data from the engine computer also can be supplied to the microprocessor. The engine data is indicative of the trailer load and would be used to select an appropriate brake controller response curve. Other vehicle operating parameters can be monitored by the microprocessor and used to select the linear or non-linear response curve to provide an optimum stopping characteristics for the towed vehicle.

It will be appreciated that a simple non-linear response curve is shown in FIG. 4 for illustrative purposes. The present invention contemplates that the response curve can include a sequential series of linear and/or non-linear segments which, in combination, define the desired braking characteristic for the brake controller 11. Also, the non-linear portion of the response curve can have other shapes than has been shown in FIG. 4. For example, the output signal duty cycle could begin increasing rapidly in response to a change in the brake control signal. The rate of increase of the duty cycle could then be reduced as the braking cycle continues (not shown). The resulting towed vehicle brake actuation would begin quickly and then continue to increase, but with a slowing rate of increase.

Figure 5:
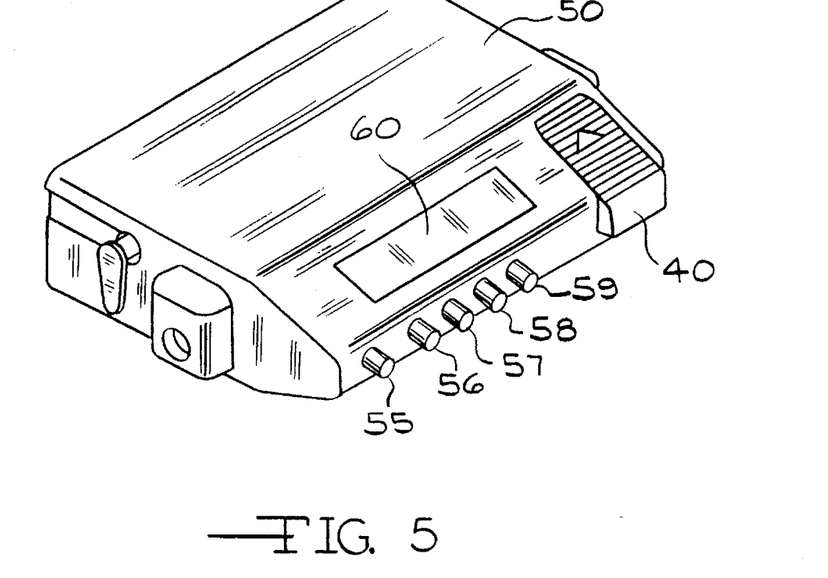
FIG. 5 shows an alternate embodiment of a non-linear brake controller in accordance with the invention.

An alternate embodiment of a non-linear electronic trailer brake controller 50 is shown in FIG. 5. In the preferred embodiment of the controller 50 shown in FIG. 5, a plurality of push-buttons are mounted on the front of the controller 50. Each of the push-buttons corresponds to a variable parameter which causes a microprocessor (not shown) in the controller 50 to select a particular controller response curve. The push-buttons allow the towing vehicle operator to select a value for each of the parameters which corresponds to the current operating conditions.

In the preferred embodiment, five push-buttons, labeled 55 through 59, are used. The first push-button 55 corresponds to a controller gain parameter and allows the operator to select one of eight discrete preprogrammed gain levels for the brake controller 50. The second push-button 56 corresponds to the operating mode parameter and is used by the operator to select a city or highway driving mode. The third push-button 57 corresponds to a load parameter for the towed vehicle and allows the operator to select a value corresponding to a fully loaded, half loaded or empty towed vehicle. The fourth push-button 58 corresponds to a road surface condition parameter and is used by the operator to select a value representing a dry, wet or icy road surface. The fifth push-button 59 corresponds to a braking cycle response time parameter and allows the operator to select a slow, medium or fast response time. Successive operation of each push-button sequences the microprocessor through each of the available values for the selected parameter. While five push-buttons are shown in FIG. 5, it will be appreciated that more or less push-buttons can be used.

The controller 50 also includes a visual display 60 to provide visual feedback to the towing vehicle operator. The display 60 is formed from conventional devices, such as liquid crystal display elements or light emitting diodes. Upon depressing any of the push-buttons, the display 60 indicates the present value for the associated parameter. When the push-button is operated to sequence the microprocessor through the available values for the parameter, the value appears on the display 60. For example, successive actuation of the second push-button 56 will cause the microprocessor to alternate between city and highway modes while the display 60 displays "city mode" or "highway mode" to correspond to the setting. When the appropriate value for the parameter is displayed, the operator releases the second push-button 56 and the present value is assigned to the operating mode parameter by the microprocessor.

In the preferred embodiment, a plurality of brake controller response curves are stored in the memory of the microprocessor with one curve corresponding to each unique combination of parameter values. The microprocessor continuously samples the current values of the parameters and selects the response curve which corresponds to the particular combination of parameter values. The selection of the response curve is interactive. Upon detection of a changed value for a parameter, the microprocessor selects a new response curve which corresponds to the new parameter value. For example, when the towed and towing vehicle leave a city and enter a highway, the vehicle operator depresses the second push-button to switch the microprocessor from the city mode to the highway mode. The microprocessor detects the changed parameter value and selects a corresponding brake response curve from the memory. The microprocessor then substitutes the selected brake response curve for the city mode brake response curve.

Alternately, the microprocessor can generate a brake controller response curve according to stored algorithms which include the parameter values as variables. The microprocessor generates a new controller response curve upon detecting a change in any of the parameter values.

Figure 6:
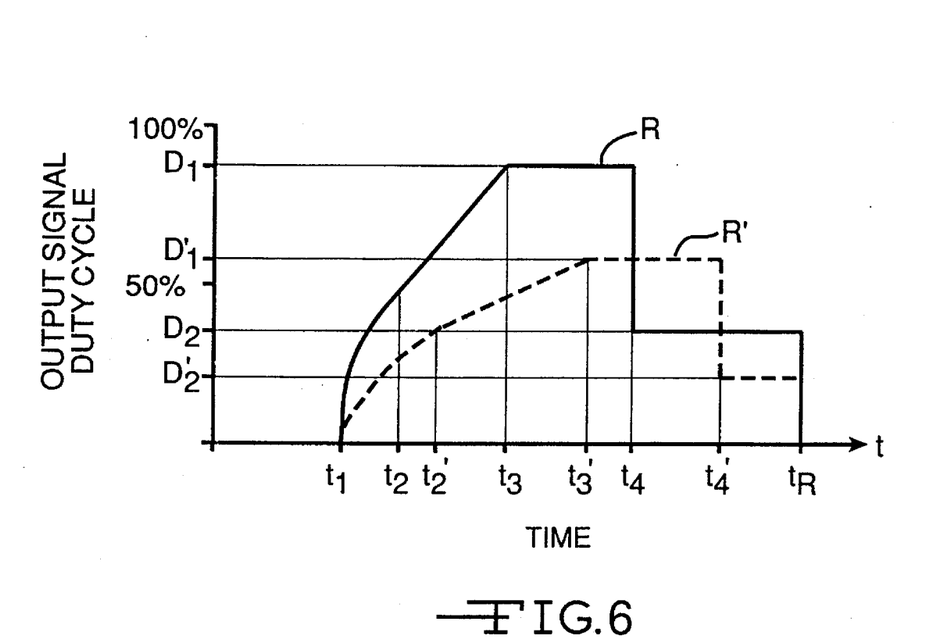
FIG. 6 is a graph illustrating response curves for the non-linear controller shown in FIG. 5.

Two typical brake controller response curves, labeled R and R', are illustrated in FIG. 6. The curve represented by the solid line labeled R corresponds to a dry road surface while the curve represented by the dashed line labeled R' corresponds to a wet road surface. As shown in FIG. 6, the curves include both non-linear and linear segments which are connected sequentially. Alternately, the curves can consist of only linear segments or only non-linear segments.

In the preferred embodiment, depression of the towing vehicle brake pedal at $t_1$ will generate a brake control signal which actuates the brake controller 50. With the dry road surface parameter selected, the brake controller 50 will generate an output signal having a duty cycle which varies as a function of time in accordance with response curve R in FIG. 6. The duty cycle will initially increase in accordance with a non-linear function of time, as shown from $t_1$ to $t_2$. From $t_2$ to $t_3$, the duty cycle continues to increase following a linear function of time to a maximum value of $D_1$. The duty cycle remains constant at $D_1$ until $t_4$, at which time the duty cycle is reduced to $D_2$. The microprocessor output signal remains constant at $D_2$ until the brake pedal 21 is released at $t_R$, at which time the duty cycle returns to zero. Accordingly, the towed vehicle brakes are completely released.

In the preferred embodiment, once initiated, the towed vehicle brake application cycle is controlled solely by the microprocessor, independent of a brake control signal. As will be discussed below, the controller 50 does not include a brake control signal generator. The brake output signal is discontinued when the brake pedal 21 is released. Thus, if the brake pedal 21 is released between $t_3$ and $t_4$, the duty cycle of the output signal will be immediately reduced to zero, even though the response curve has not reached the final duty cycle value of $D_2$. If the brake pedal 21 is again depressed, the brake cycle is reinitiated from the starting point.

On wet road surfaces, the coefficient of friction between the towed vehicle tires and the road surface is reduced. Accordingly, the braking of the towed vehicle should be reduced in speed and intensity. As described above, a typical wet road brake response curve is illustrated by the brake controller response curve labeled R' in FIG. 6. If precipitation should wet the road surface during a trip, the towing vehicle operator would successively depress the fourth push-button 58 until the message "wet road" appears on the display 60. The microprocessor would then replace the dry road surface response curve R with the wet road surface response curve R'. When the brake pedal 21 is next depressed, the microprocessor generates an output signal having a duty cycle which varies as a function of time in accordance with the response curve R', with the towed vehicle brakes being applied more slowly and with less intensity. Similarly, when the values of the other parameters are changed as operating conditions change, causing the microprocessor to generate other brake controller response curves.

Figure 7:
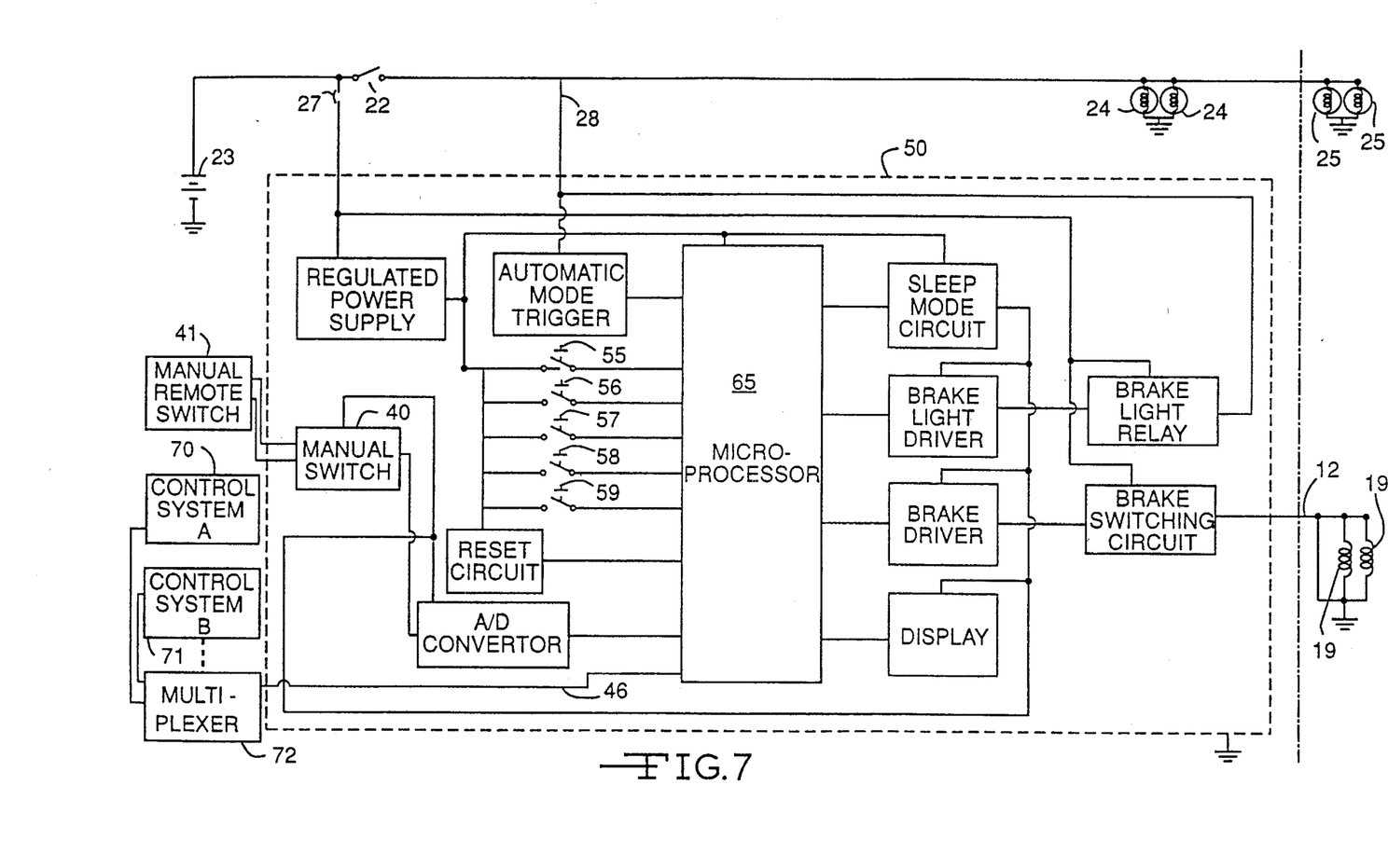
FIG. 7 is a block diagram for the non-linear controller shown in FIG. 5.

A block diagram of the controller 50 which includes connections to the towing and towed vehicles is shown in FIG. 7. The controller 50 includes a number of functional blocks and components which correspond to similar functional blocks and components included in an electronic trailer brake controller described in the co-pending application listed above. The microprocessor is labeled 65 in FIG. 7.

As shown in FIG. 7, the push-button 55 through 59 actuate switches which are connected between a regulated power supply and a corresponding microprocessor input pin. Thus, depressing one of the push-buttons closes the associated switch to apply five volts to the input pin. Releasing the button removes the voltage from the input pin. As described above, the brake cycle is triggered when the brake pedal 21 is depressed and continues under the control of the microprocessor 65 while the brake pedal 21 remains depressed. Accordingly, the controller 50 does not include a brake signal generator.

As also described above, the microprocessor 65 can receive data from systems mounted on the towed vehicle through a data link 46. Additionally, the microprocessor 65 can send data through the data link 46 to the towed vehicle systems. This is illustrated in FIG. 7, where a plurality of control systems are shown external to the controller 50. While only two control systems, A and B, which are labeled 70 and 71, are shown, it will be appreciated that additional control systems can be included. The control systems 70 and 71 can include any of the towing vehicle control systems which sense the towing vehicle operating parameters, such as the ABS and/or TC controller, the engine computer, the towing vehicle diagnostic computer and the towing vehicle light-on-module (LOM). Additionally, other towing vehicle control systems which include a microprocessor, such as transmission or air bag control systems and anti-theft/security systems, can provide data to the brake controller microprocessor 65.

A multiplexer 72 is connected to output terminals of the control systems 70 and 71. The multiplexer 72 samples the data appearing at each control system output terminal and generates a combined data stream. The combined data stream is transmitted over the data link 46 to the microprocessor 65. The microprocessor 65 separates the data stream into the original data. Thus, the data link 46 functions as a data highway. The use of a multiplexer 72 and data highway simplifies the installation of the brake controller 50 in the towed vehicle by reducing the amount of required wiring.

The microprocessor 65 continuously monitors the data received over the data link 46. Upon detecting a change in one of the response curve parameters, the microprocessor 65 automatically initiates an update of the brake response curve. As described above, the microprocessor 65 can update the brake response curve by either selecting another response curve from storage or by using algorithms to calculate a new curve.

Figure 8:
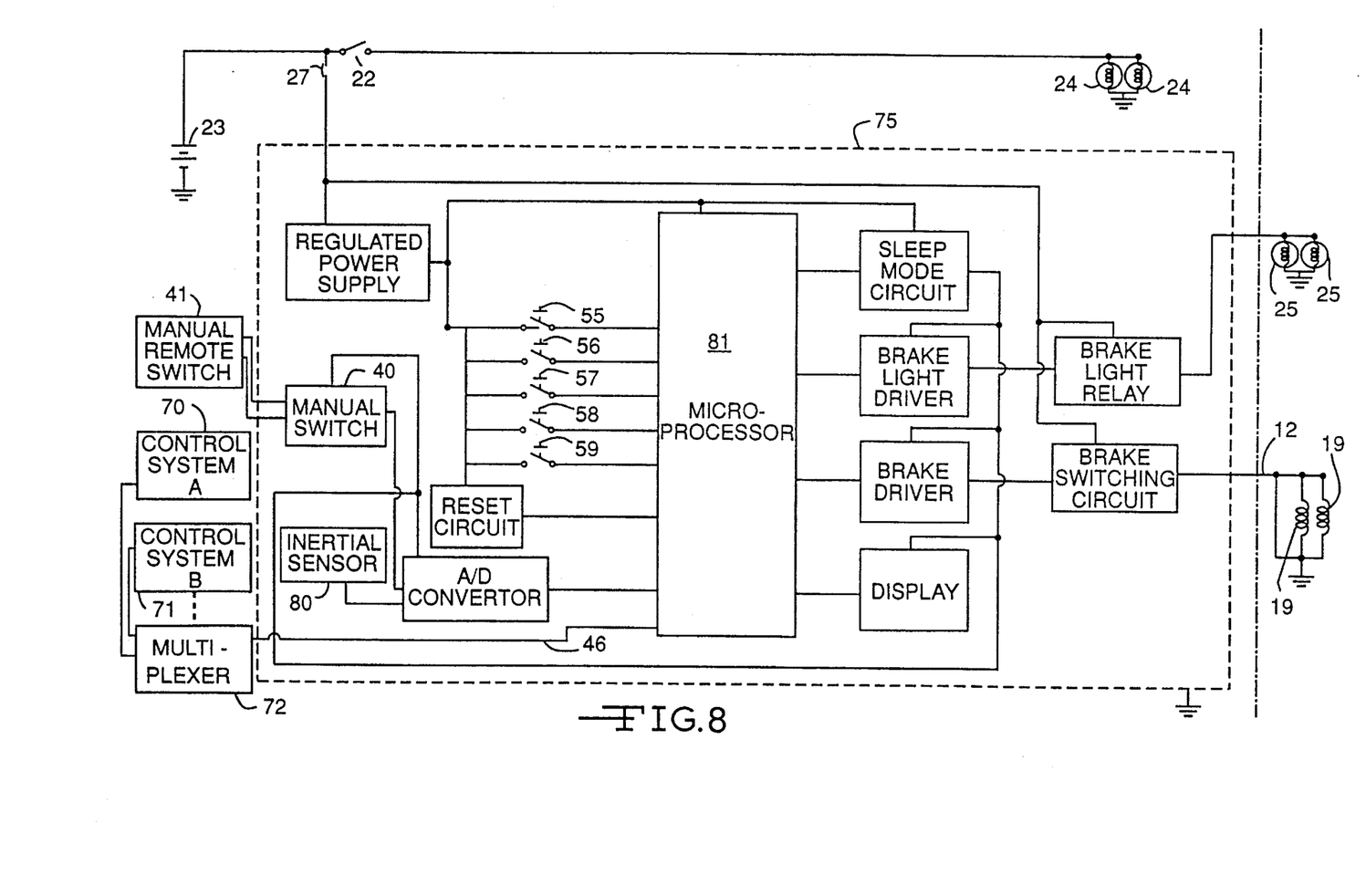
FIG. 8 is a block diagram for an alternate embodiment of the non-linear controller shown in FIG. 7.

An alternate embodiment of the non-linear controller 75, which is illustrated by a block diagram in FIG. 8, contemplates initiating a braking cycle with a trigger signal generated by an inertial sensing device. The controller 75 includes an inertial sensor 80 which has an output connected to one of the channels of an A/D converter. The sensor 80 is a commercially available device, such as the pendulum device described in U.S. Pat. No. 4,721,344, which is incorporated herein by reference. The braking cycle is initiated when deceleration of the towing vehicle displaces the sensing device 80 from its normal rest position causing the sensor to begin generating a trigger signal. The trigger signal causes a microprocessor 81 to begin generating an output signal to the electric brakes 13 and 14. The sensing device 80 continues to generate the trigger signal as long as it is displaced from its rest position. When the towing vehicle ceases decelerating, the inertial sensor returns to its rest position and the trigger signal is reduced to zero. This causes the microprocessor 81 to terminate the braking cycle. The controller 75 also can include an adjustable delay to terminate the braking cycle after the sensing device returns to its rest position.

While a pendulum device has been described as generating the brake cycle trigger signal, it will be appreciated that the devices described above for generating a brake control signal also can be used to generate a brake cycle trigger signal.

Because the controller 75 operates upon detection of towing vehicle deceleration, an automatic mode trigger generator and connection 28 to the brake line circuit shown in FIG. 7 is omitted from FIG. 8. This simplifies the wiring required to install the controller 75 in the towing vehicle.

As shown in FIG. 8, the output of the inertial sensor 80 is converted to a digital signal consisting of a series of pulses by an A/D converter. The magnitude of each pulse is proportional to the deceleration of the towing vehicle. The microprocessor 81 is programmed to calculate an average brake trigger signal by averaging the magnitudes of the trigger signals received from the inertial sensor over a predetermined period of time. The resulting average brake trigger signal must exceed a threshold level which is stored in the microprocessor 81 for initiation of a braking cycle. Thus, extraneous trigger signals are prevented from causing false braking cycles. In the preferred embodiment, the period of time used for averaging the signal can be varied by the towing vehicle operator to adjust the sensitivity of the controller. For example, one of the push-buttons 55 through 59 can be used to vary the averaging time period.

The present invention also contemplates a similar time averaging of the brake control signal for the controller 11 described above. The controller 11 includes a brake control signal generator which generates a continuous automatic brake control signal. The brake control signal has a magnitude proportional to the deceleration of the towing vehicle. The automatic brake control signal is converted to a series of pulses by an A/D converter which are input to the microprocessor. Each of the pulses has a magnitude which is proportional to the automatic brake control signal. The present invention contemplates that the microprocessor is programmed to calculate an average brake control signal by averaging the magnitudes of the brake control signal pulses over a predetermined period of time. The resulting average brake control signal must exceed a threshold level which is stored in the microprocessor for initiation of a braking cycle. Thus, extraneous brake control signals are prevented from causing false braking cycles. In the preferred embodiment, the period of time used for averaging the signal can be varied by the towing vehicle operator to adjust the sensitivity of the controller. For example the push-button 32 also can be used to vary the averaging time period. Alternately, a second push-button (not shown) or other selector device can be included in the controller 11 for changing the averaging time period.

The invention further contemplates that the brake controller microprocessor can be programmed to average the brake trigger signal received from the automatic mode trigger shown in FIG. 7, or the operating data received from the data link 46 over a predetermined time period. The brake controller microprocessor is then responsive to the resulting average signals.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment has been described as having a controller output signal comprising a constant frequency pulse train having a variable duty cycle, the invention also can be practiced with other types of output signals.

What is claimed is:

1. An electronic controller for actuating electric wheel brakes of a towed vehicle in response to actuation of the brakes of an associated towing vehicle, the controller comprising:

a detection device for detecting an initiation of a braking cycle for the towing vehicle, said detection device responsive to said braking cycle initiation to generate an input signal;

a microprocessor connected to said detection device, said microprocessor including a memory, said memory storing a plurality of brake response curves, each of said brake response curves defining a time relationship between said input signal and said output signal; and a selector coupled to said microprocessor and operative by the towing vehicle operator, said microprocessor being responsive to operation of said selector to select one of said brake response curves, said microprocessor also being responsive to said input signal and said selected brake response curve to generate an output signal for actuating the towed vehicle wheel brakes, said output signal varying as a function of time in accordance with said selected brake response curve.

2. An electronic controller according to claim 1 wherein said detection device includes a sensor which is adapted to be connected to the towing vehicle brake light circuit and is responsive thereto to generate said input signal, said input signal including a brake trigger signal while the towing vehicle brakes are actuated and to discontinue generation of said brake trigger signal upon release of said towing vehicle brakes, said microprocessor being responsive to said brake trigger signal and to said selected brake response curve to generate said output signal.

3. An electronic controller according to claim 2 wherein said sensor generates a series of brake trigger signals, said microprocessor averaging said brake trigger signals over a predetermined period of time to generate an average brake trigger signal, said microprocessor being responsive to said average brake trigger signal and said selected brake response curve to generate said output signal.

4. An electronic controller according to claim 1 wherein the controller includes a plurality of selectors whereby the operator can input towing vehicle operating data to said microprocessor, said microprocessor being responsive to said towing vehicle operating data to select said brake response curve.

5. An electronic controller according to claim 4 wherein at least one of said brake response curves includes a non-linear portion.

6. An electronic controller according to claim 5 wherein at least one of said selectors is a push-button.

7. An electronic controller according to claim 1 wherein said detection device includes an inertial sensor which is operable to generate said input signal, said input signal including a series of brake trigger signals upon deceleration of the towing vehicle, said microprocessor receiving said brake trigger signals and averaging said brake trigger signals over a predetermined period of time to generate an average brake trigger signal, said microprocessor initiating a braking cycle only when said average brake trigger signal exceeds a predetermined threshold value.

8. An electronic controller according to claim 7 further including a selector which is operable by the towing vehicle operator to adjust said predetermined period of time for averaging said brake trigger signal.

9. An electronic controller according to claim 1 wherein said detection device includes an inertial sensor which is operable to generate said input signal, said input signal including a brake control signal, said microprocessor being responsive to said brake control signal and said brake response curve to generate said output signal, said output signal having a variable duty cycle which is a function of said brake control signal and said selected brake response curve.

10. An electronic controller according to claim 9 wherein said microprocessor averages said brake control signal over a predetermined time period to determine an average brake control signal, and further wherein said microprocessor generates an output signal having a variable duty cycle, said duty cycle also being a function of said average brake control signal.

11. An electronic controller for actuating electric wheel brakes of a towed vehicle in response to actuation of the brakes of an associated towing vehicle, the towing vehicle including a device for collecting towing vehicle operating data, the controller comprising:

a detection device for detecting an initiation of a braking cycle for the towing vehicle, said detection device responsive to said braking cycle initiation to generate an input signal;

a microprocessor connected to said detection device, said microprocessor including a memory, said memory storing a plurality of brake response curves, each of said brake response curves defining a time relationship between said input signal and said output signal; and a data link adapted to connect said microprocessor to the device for collecting towing vehicle operating data, said microprocessor receiving towing vehicle operating data over said data link and being responsive to said data to select one of said brake response curves, said microprocessor also being responsive to said input signal and said selected brake response curve to generate an output signal for actuating the towed vehicle brakes, said output signal varying as a function of time in accordance with said selected brake response curve.

12. An electronic controller according to claim 11 wherein at least one of said brake response curves includes a non-linear portion.

13. An electronic controller according to claim 11 wherein said device for collecting operating data is included in a towing vehicle control system which has a microprocessor and said data link is connected to said towing vehicle control system microprocessor.

14. An electronic controller according to claim 13 wherein said data link is included in a data highway.

15. An electronic controller according to claim 14 wherein said data highway includes a multiplexer.

16. An electronic controller according to claim 11 wherein said device for collecting operating data includes a sensor mounted upon the towing vehicle and said data link is connected to said sensor.

17. An electronic controller according to claim 11 wherein said detection device includes a sensor which is adapted to be connected to the towing vehicle brake light circuit and is responsive thereto to generate said input signal, said input signal including a brake trigger signal while the towing vehicle brakes are actuated and to discontinue generation of said brake trigger signal upon release of said towing vehicle brakes, said microprocessor being responsive to said brake trigger signal and to said selected brake response curve to generate said output signal.

18. An electronic controller according to claim 17 wherein said sensor generates a series of brake trigger signals, said microprocessor averaging said brake trigger signals over a predetermined period of time to generate an average brake trigger signal, said microprocessor being responsive to said average brake trigger signal and said selected brake response curve to generate said output signal.

19. An electronic controller according to claim 11 wherein said detection device includes an inertial sensor which is operable to generate said input signal, said input signal including a series of brake trigger signals upon deceleration of the towing vehicle, said microprocessor receiving said brake trigger signals and averaging said brake trigger signals over a predetermined period of time to generate an average brake trigger signal, said microprocessor initiating a braking cycle only when said average brake trigger signal exceeds a predetermined threshold value.

20. An electronic controller according to claim 19 further including a selector which is operable by the towing vehicle operator to adjust said predetermined period of time for averaging said brake trigger signals.

21. An electronic controller according to claim 11 wherein said detection device includes an inertial sensor which is operable to generate said input signal, said input signal including a brake control signal, said microprocessor being responsive to said brake control signal and said brake response curve to generate said output signal, said output signal having a variable duty cycle which is a function of said brake control signal and said selected brake response curve.

22. An electronic controller according to claim 21 wherein said microprocessor averages said brake control signal over a predetermined time period to determine an average brake control signal, and further wherein said microprocessor generates an output signal having a variable duty cycle, said duty cycle also being a function of said average brake control signal.

23. An electronic controller for actuating electric wheel brakes of a towed vehicle in response to actuation of the brakes of an associated towing vehicle, the controller comprising:

a detection device for detecting an initiation of a braking cycle for the towing vehicle, said detection device responsive to said braking cycle initiation to generate an input signal;

a microprocessor connected to said detection device, said microprocessor including a memory, said memory storing a plurality of brake response curve algorithms; and a plurality of selectors coupled to said microprocessor and operative by the towing vehicle operator to input towing vehicle operating data to said microprocessor, said microprocessor being responsive to operation of said selectors to combine said towing vehicle operating data with said algorithms to generate a brake response curve, said brake response curve defining a time relationship between said input signal and said output signal, said microprocessor also being responsive to said input signal and said generated brake response curve to generate an output signal for actuating the towed vehicle brakes, said output signal varying as a function of time in accordance with said generated brake response curve.

24. An electronic controller according to claim 23 wherein said brake response curve generated by said microprocessor includes a non-linear portion.

25. An electronic controller according to claim 24 wherein at least one of said selectors is a push-button.

26. An electronic controller according to claim 23 wherein said detection device includes a sensor which is adapted to be connected to the towing vehicle brake light circuit and is responsive thereto to generate said input signal, said input signal including a brake trigger signal while the towing vehicle brakes are actuated and to discontinue generation of said brake trigger signal upon release of said towing vehicle brakes, said microprocessor being responsive to said brake trigger signal and to said selected brake response curve to generate said output signal.

27. An electronic controller according to claim 26 wherein said sensor generates a series of brake trigger signals, said microprocessor averaging said brake trigger signals over a predetermined period of time to generate an average brake trigger signal, said microprocessor being responsive to said average brake trigger signal and said selected brake response curve to generate said output signal.

28. An electronic controller according to claim 23 wherein said detection device includes an inertial sensor which is operable to generate said input signal, said input signal including a series of brake trigger signals upon deceleration of the towing vehicle, said microprocessor receiving said brake trigger signals and averaging said brake trigger signals over a predetermined period of time to generate an average brake trigger signal, said microprocessor initiating a braking cycle only when said average brake trigger signal exceeds a predetermined threshold value.

29. An electronic controller according to claim 28 further including a selector which is operable by the towing vehicle operator to adjust said predetermined period of time for averaging said brake trigger signals.

30. An electronic controller according to claim 23 wherein said detection device includes an inertial sensor which is operable to generate said input signal, said input signal including a brake control signal, said microprocessor being responsive to said brake control signal and said brake response curve to generate said output signal, said output signal having a variable duty cycle which is a function of said brake control signal and said selected brake response curve.

31. An electronic controller according to claim 30 wherein said microprocessor averages said brake control signal over a predetermined time period to determine an average brake control signal, and further wherein said microprocessor generates an output signal having a variable duty cycle, said duty cycle also being a function of said average brake control signal.

32. An electronic controller for actuating electric wheel brakes of a towed vehicle in response to actuation of the brakes of an associated towing vehicle, the towing vehicle including a device for collecting towing vehicle operating data, the controller comprising:

a detection device for detecting an initiation of a braking cycle for the towing vehicle, said detection device responsive to said braking cycle initiation to generate an input signal;

a microprocessor connected to said detection device, said microprocessor including a memory, said memory storing a plurality of brake response curve algorithms; and a data link adapted to connect said microprocessor to the device for collecting towing vehicle operating data, said microprocessor receiving towing vehicle operating data over said data link and being responsive thereto to combine said towing vehicle operating data with said algorithms to generate a brake response curve, said brake response curve defining a time relationship between said input signal and said output signal, said microprocessor also being responsive to said input signal and said generated brake response curve to generate an output signal for actuating the towed vehicle brakes, said output signal varying as a function of time in accordance with said generated brake response curve.

33. An electronic controller according to claim 32 wherein said brake response curve generated by said microprocessor includes a non-linear portion.

34. An electronic controller according to claim 32 wherein said device for collecting operating data is included in a towing vehicle control system which has a microprocessor and said data link is connected to said towing vehicle control system microprocessor.

35. An electronic controller according to claim 34 wherein said data link is included in a data highway.

36. An electronic controller according to claim 35 wherein said data highway includes a multiplexer.

37. An electronic controller according to claim 32 wherein said device for collecting operating data includes a sensor mounted upon the towing vehicle and said data link is connected to said sensor.

38. An electronic controller according to claim 32 wherein said controller microprocessor averages said vehicle operating data over a predetermined time period to generate an average operating data signal, said microprocessor being responsive to said average operating data signal to combine said operating data with said algorithms to generate said brake response curve.

39. An electronic controller according to claim 32 wherein said detection device includes a sensor which is adapted to be connected to the towing vehicle brake light circuit and is responsive thereto to generate said input signal, said input signal including a brake trigger signal while the towing vehicle brakes are actuated and to discontinue generation of said brake trigger signal upon release of said towing vehicle brakes, said microprocessor being responsive to said brake trigger signal and to said selected brake response curve to generate said output signal.

40. An electronic controller according to claim 39 wherein said sensor generates a series of brake trigger signals, said microprocessor averaging said brake trigger signals over a predetermined period of time to generate an average brake trigger signal, said microprocessor being responsive to said average brake trigger signal and said selected brake response curve to generate said output signal.

41. An electronic controller according to claim 32 herein said detection device includes an inertial sensor which is operable to generate said input signal, said input signal including a series of brake trigger signals upon deceleration of the towing vehicle, said microprocessor receiving said brake trigger signals and averaging said brake trigger signals over a predetermined period of time to generate an average brake trigger signal, said microprocessor initiating a braking cycle only when said average brake trigger signal exceeds a predetermined threshold value.

42. An electronic controller according to claim 41 further including a selector which is operable by the towing vehicle operator to adjust said predetermined period of time for averaging said brake trigger signals.

43. An electronic controller according to claim 32 wherein said detection device includes an inertial sensor which is operable to generate said input signal, said input signal including a brake control signal, said microprocessor being responsive to said brake control signal and said brake response curve to generate said output signal, said output signal having a variable duty cycle which is a function of said brake control signal and said selected brake response curve.

44. An electronic controller according to claim 43 wherein said microprocessor averages said brake control signal over a predetermined time period to determine an average brake control signal, and further wherein said microprocessor generates an output signal having a variable duty cycle, said duty cycle also being a function of said average brake control signal.

* * * * *